US011067065B2

(12) United States Patent
Siddiqui et al.

(10) Patent No.: US 11,067,065 B2
(45) Date of Patent: Jul. 20, 2021

(54) PLASMA PRODUCTION AND CONTROL DEVICE

(71) Applicant: PHASE FOUR, INC., El Segundo, CA (US)

(72) Inventors: Mohammed Umair Siddiqui, Playa Vista, CA (US); Joshua Robert Synowiec, Canton, MI (US); Jason Jackson Wallace, South Pasadena, CA (US); Simon Rubin Halpern, Los Angeles, CA (US)

(73) Assignee: PHASE FOUR, INC., El Segundo, CA (US)

(*) Notice: Subject to any disclaimer, the term of this patent is extended or adjusted under 35 U.S.C. 154(b) by 0 days.

(21) Appl. No.: 16/439,205

(22) Filed: Jun. 12, 2019

(65) Prior Publication Data

US 2019/0390662 A1 Dec. 26, 2019

Related U.S. Application Data

(63) Continuation of application No. PCT/US2017/059096, filed on Oct. 30, 2017.

(60) Provisional application No. 62/437,607, filed on Dec. 21, 2016.

(51) Int. Cl.

*F03H 1/00* (2006.01)
*H05H 1/46* (2006.01)
*B64G 1/40* (2006.01)

(52) U.S. Cl.

CPC ......... *F03H 1/0093* (2013.01); *F03H 1/0081* (2013.01)

(58) Field of Classification Search

CPC .... F03H 1/0018; F03H 1/0081; F03H 1/0093; F03H 1/0037; F03H 1/0075; F03H 1/00; F03H 1/0087; B64G 1/402; B64G 1/405; H05H 1/46; H05H 1/54; H05H 7/02; H05H 7/087; H05H 2001/463; H05H 2001/4667; H05H 1/24; H05H 1/4652; H01J 27/18; H01J 27/143; H01J 27/146

See application file for complete search history.

(56) References Cited

U.S. PATENT DOCUMENTS 2,992,345 A 7/1961 Hansen
3,173,248 A 3/1965 Curtis et al.
3,388,291 A 6/1968 Cann
4,862,032 A 8/1989 Kaufman et al.
5,339,623 A 8/1994 Smith
5,418,431 A 5/1995 Williamson et al.

(Continued)

FOREIGN PATENT DOCUMENTS

CN 104411082 A 3/2015
EP 3560298 A1 10/2019

(Continued)

OTHER PUBLICATIONS

WO, PCT/US17/59096 ISR and written Opinion, dated Jan. 29, 2018.

(Continued)

*Primary Examiner* — Haissa Philogene
(74) *Attorney, Agent, or Firm* — Steinfl + Bruno, LLP

(57) ABSTRACT

The invention provides a plasma production and control device that may be used in propulsion (e.g., satellite propulsion) and/or industrial applications. The plasma production system comprises a unidirectional magnetic field.

21 Claims, 3 Drawing Sheets

(56) References Cited

U.S. PATENT DOCUMENTS

| | | | | |
|---|---|---|---|---|
| 5,751,113 | A | 5/1998 | Yashnov et al. | |
| 5,945,781 | A * | 8/1999 | Valentian | F03H 1/0075 313/362.1 |
| 6,293,090 | B1 | 9/2001 | Olson | |
| 6,449,941 | B1 | 9/2002 | Warboys et al. | |
| 6,771,026 | B2 * | 8/2004 | Vukovic | H01J 37/32082 118/723 MA |
| 7,176,469 | B2 | 2/2007 | Leung et al. | |
| 7,400,096 | B1 | 7/2008 | Foster et al. | |
| 7,461,502 | B2 | 12/2008 | Emsellem | |
| 7,498,592 | B2 | 3/2009 | Hershkowitz et al. | |
| 8,593,064 | B2 * | 11/2013 | Chang Diaz | F03H 1/0093 315/111.61 |
| 8,635,850 | B1 * | 1/2014 | Light | F03H 1/0037 313/359.1 |
| 8,729,806 | B2 * | 5/2014 | Kwan | H01J 27/16 315/111.21 |
| 8,875,485 | B2 * | 11/2014 | Keidar | F03H 1/0087 60/202 |
| 9,215,789 | B1 | 12/2015 | Hala et al. | |
| 9,591,741 | B2 * | 3/2017 | Larigaldie | H01J 27/18 |
| 2002/0008451 | A1 | 1/2002 | Gibson | |
| 2010/0213851 | A1 | 8/2010 | Chang Diaz | |
| 2012/0080148 | A1 | 4/2012 | Zhang | |
| 2012/0217876 | A1 | 8/2012 | Diamant et al. | |
| 2013/0067883 | A1 | 3/2013 | Emsellem et al. | |
| 2013/0200219 | A1 | 8/2013 | Marchandise et al. | |
| 2014/0202131 | A1 | 7/2014 | Boswell | |
| 2014/0263181 | A1 | 9/2014 | Park | |
| 2016/0200458 | A1 | 7/2016 | Longmier et al. | |
| 2016/0207642 | A1 | 7/2016 | Longmier et al. | |
| 2018/0310393 | A1 | 10/2018 | Castillo Acero et al. | |
| 2019/0107103 | A1 * | 4/2019 | Siddiqui | F03H 1/0093 |
| 2019/0107104 | A1 | 4/2019 | Siddiqui | |

FOREIGN PATENT DOCUMENTS

| | | | |
|---|---|---|---|
| JP | 62-63179 | A | 3/1987 |
| WO | WO 2015/031447 | A1 | 3/2015 |
| WO | WO 2015/031450 | A1 | 3/2015 |
| WO | 2018/118223 | A1 | 6/2018 |
| WO | WO 2019/074785 | A1 | 4/2019 |

OTHER PUBLICATIONS

Bathgate, S. N., et al., "Electrodeless plasma thrusters for spacecraft: a review", Plasmas Sci. Technol.,2017, vol. 19, pp. 1-24.

Bonoli, P. T., "Review of recent experimental and modeling progress in the lower hybrid range of frequencies at ITER relevant parameters", Physics of Plasmas, 2014, vol. 21, pp. 061508-1-061508-22.

Cannat, F., et al., "Optimization of a coaxial electron cyclotron resonance plasma thruster with an analytical model", Physics of Plasmas, 2015, vol. 22, pp. 053503-1-053503-11.

Chabert, P., et al., "Physics of Radio-Frequency Plasmas", Cambridge University Press, 2011, p. 275.

Chen, F. F., et al., "Upper Limit to Landau Damping in Helicon Discharges", Physical Review Letters, 1999, vol. 82, No. 13, pp. 2677-2680.

Chen, F. F., "Helicon discharges and sources: a review", Plasmas Sources Sci. Technol., 2015, vol. 24, pp. 1-25.

Choi, G., "13.56 MHz, CLASS-E, 1KW RF Generator using a Microsemi DRF1200 Driver/MOSFET Hybrid", retrieved from www.microsemi.com, 2013, pp. 1-10.

Choueiri, E. Y., et al., "Coherent Ion Acceleration using Two Electrostatic Waves", 36th AIAA/ASME/SAE/ASSE Joint Propulsion Conference, Huntsville, AL, 2000, pp. 1-12.

Collard, T. A., et al., "A Numerical Examination of the Performance of Small Magnetic Nozzle Thrusters", 53rd AIA/SAE/ASEE Joint Propulsion Conference, 2017, pp. 1-16.

Dedrick, J., et al., "Transient propagation dynamics of flowing plasmas accelerated by radio-frequency electric fields", Physics of Plasmas, 2017, vol. 24, pp. 050703-1-050703-4.

Ellingboe, A. R., et al., "Electron beam pulses produced by heliconwave excitation", Physics of Plasmas, 1995, vol. 2, No. 6, pp. 1807-1809.

Gerwin, R. A., Integrity of the Plasma Magnetic Nozzle, Los Alamos National Laboratory, Los Alamos, New Mexico, 2009, NASA/TP-2009213439, pp. 1-120.

Gilland, J., et al., "Neutral pumping in a helicon discharge", Plasmas Sources Sci. Technol., 1988, pp. 416-422.

Hofer, R. F., et al., "A Comparison of Nude and Collimated Faraday Probes for Use with Hall Thrusters", 27th International Electric Propulsion Conference, Pasadena, CA, 2001, pp. 1-17.

Hopwood, J., "Review of inductively coupled plasmas for plasma processing", Plasma Sources Sci. Technol., 1992, vol. 1, pp. 109-116.

Hsu, A. G., et al., "Laboratory Testing of a Modular 8-Thruster Scalable Ion Electrospray Propulsion System", retrieved from https://iepc2017.org/sites/default/files/speaker-papers/aiaa_iepc_paper_electrospray_hsu_final.pdf on May 17, 2018, pp. 1-12.

Huba, J.D., "NRL Plasma Formulary", Naval Research Laboratory, Washington DC, 2013. pp. 1-71.

Jacobson, V. T., et al., "Development of VASIMR Helicon Source", 43nd Annual Meeting of the APS Division of Plasma Physics Mini-Conference on Helicon Sources, Long Beach, California, 2001, pp. 1-35.

Kikuchi, T., et al., "Plasma Production and Wave Propagation in a Plasma Source Using Lower Hybrid Waves", Jpn. J. Appl. Phys., 1999, vol. 38, pp. 4351-4356.

Kinder, R. L., et al., "Noncollisional heating and electron energy distributions in magnetically enhanced inductively coupled and helicon plasma sources", Journal of Applied Physics, 2001, vol. 90, No. 8, pp. 3699-3712.

Liou, J. J., et al, "RF MOSFET: recent advances, current status and future trends", Solid-State Electronics, 2003, vol. 47, pp. 1881-1895.

Longmier, B. W., et al., "Ambipolar Ion Acceleration in the Expanding Magnetic Nozzle of the VASIMR® VX-200i", 45th AIAA/ASME/SAE/ASEE Joint Propulsion Conference & Exhibit, Denver, Colorado, 2009, pp. 1-10.

Longmier, B. W., et al., "VX-200 Magnetoplasma Thruster Performance Results Exceeding Fifty-Percent Thruster Efficiency", Journal of Propulsion and Power, 2011, vol. 27, No. 4, pp. 915-920.

Magee, R. M., et al., "Direct measurements of the ionization profile in krypton helicon plasmas", Physics of Plasmas, 2012. vol. 19, pp. 123506-1-123506-6.

Nishiyama, K., et al., "Development and Testing of the Hayabusa2 Ion Engine System", Joint Conference of 30th International Symposium of Space Technology and Science 34th International Electric Propulsion Conference and 6th Nano-satellite Symposium, Hyogo-Kobe, Japan, 2015, pp. 1-15.

Pavarin, D., et al., "Design of 50 W Helicon Plasma Thruster", $31^{st}$ International Electric Propulsion Conference, Ann Arbor, Michigan, Sep. 20-24, 2009, pp. 1-8.

Scime, E. E., et al., "The hot hELicon eXperiment (HELIX) and the large experiment on instabilities and anisotropy (LEIA)", J. Plasma Physics, 2014, pp. 1-22.

Shabshelowitz, A., et al., "Performance and Probe Measurements of a Radio-Frequency Plasma Thruster", Journal of Propulsion and Power, 2013, vol. 29, No. 4, pp. 919-929.

Siddiqui, M. U. et al., "Electron heating and density production in microwave-assisted helicon plasmas", Plasma Sources Sci. Technol., 2015, vol. 24, pp. 1-13.

Siddiqui, M. U., et al., "First Performance Measurements of the Phase Four RF Thruster", 35th International Electric Propulsion Conference, Atlanta, GA, 2017, pp. 1-21.

Siddiqui, M.U., "Updated Performance Measurements of the Phase Four RF Thruster", $34^{th}$ Space Symposium, 2018, pp. 1-7.

Stephan, K. et al., "Absolute partial electron impact ionization cross sections of Xe from threshold up to 180 eV", Journal of Chemical Physics, 1984, vol. 81, No. 7, pp. 3116-3117.

(56) References Cited

OTHER PUBLICATIONS

Takahashi, K., et al., "Direct thrust measurement of a permanent magnet helicon double layer thruster", Applied Physics Letters, 2011, vol. 98, pp. 141503-1-141503-3.
Williams, L. T., et al., "Thrust Measurements of a Radio Frequency Plasma Source", Journal of Propulsion and Power, 2013, vol. 29, No. 3, pp. 520-527.
Blackwell, D. D., et al., "Two-dimensional imaging of a helicon discharge", Plasma Sources Science and Technology, 1997, vol. 6, pp. 569-576.
Boswell, R. W., "Very Efficient Plasma Generation by Whistler Waves Near the Lower Hybrid Frequency", Plasma Physics and Controlled Fusion, 1984, vol. 26, No. 10, pp. 1147-1162.
Courtney, D. G., et al., "Diverging Cusped-Field Hall Thruster (DCHT)", 30th International Electric Propulsion Conference, Florence, Italy, 2007, pp. 1-10.
Gilland, J., "Helicon Wave Physics Impacts on Electrodeless Thruster Design", International Electric Propulsion Conference ERPS, Toulouse, France, 2003, pp. 1-10.
Longmier, B. W., et al., "Ambipolar ion acceleration in an expanding magnetic nozzle", Plasma Sources Science and Technology, 2011, vol. 20, pp. 1-9.
Otto, A., "Chapter 1—Introduction and Review of Basic Plasma Properties", University of Alaska Fairbanks, pp. 1-22.
Plihon, N., et al., "Experimental investigation of double layers in expanding plasmas", Physics of Plasmas, 2007, vol. 14, pp. 013506-1-013506-16.
Power, J. L., et al., "Development of a High Power Microwave Thruster, With a Magnetic Nozzle, for Space Applications", 24th Microwave Power Symposium, Stamford, Connecticut, 1989, pp. 1-28.
Takahashi, K., et al., "Ion acceleration in a solenoid-free plasma expanded by permanent magnets", Physics of Plasmas, 2008, vol. 15, pp. 084501-1-084501-4.
Yildiz, M. S., "Global Energy Transfer Model of Microwave Induced Plasma in a Microwave Electrothermal Thruster Resonant Cavity", Joint Conference of 30th International Symposium on Space Technology and Science, 34th International Electric Propulsion Conference and 6th Nano-satellite Symposium, Hyogo-Kobe, Japan, 2015, pp. 1-10.
EP, 17882721.8 Extended Search Report, dated Jul. 14, 2020.
Nakamura, T., et al., "Direct Measurement of Electromagnetic Thrust if Electrodeless Helicon Plasma Thruster Using Magnetic Nozzle", World Academy of Science, Engineering, and Technology, 2012, vol. 6, No. 11, pp. 581-585.
BC wire "Copper Mag net Wire" (Year: 2015), 41 pages.
Final Office Action for U.S. Appl. No. 15/982,862, filed May 17, 2018 on behalf of Phase Four Inc dated Nov. 2, 2020 39 pages.
Final Office Action for U.S. Appl. No. 16/165,138, filed Oct. 19, 2018 on behalf of Phase Four Inc dated Jan. 21, 2020 42 pages.
Final Office Action for U.S. Appl. No. 16/165,138, filed Oct. 19, 2018, on behalf of Phase Four Inc. dated Mar. 26, 2021. 32 Pages.
International Search Report and Written Opinion for International Application No. PCT/US2018/054555 filed on Oct. 5, 2018 on behalf of Phase Four, Inc. dated Dec. 7, 2018 15 pages.
Longmier, B.W., et al., "Annbipolar ion acceleration in an expanding magnetic nozzle," Plasma Sources Sci. Technol 20015007, 2011. 10 Pages.
Non-Final Office Action for U.S. Appl. No. 15/982,862, filed May 17, 2018 on behalf of Phase Four Inc dated Jan. 22, 2020 39 pages.
Non-Final Office Action for U.S. Appl. No. 16/165,138, filed Oct. 19, 2018 on behalf of Phase Four Inc dated Aug. 14, 2020 33 pages.
Non-Final Office Action for U.S. Appl. No. 16/165,138, filed Oct. 19, 2018 on behalf of Phase Four Inc dated May 16, 2019 35 pages.
Wikipedia: Electron Cyclotron Resonance (Year: 2019), 3 pages.
Wikipedia "Gyroradius" (Year: 2019), 3 pages.

* cited by examiner

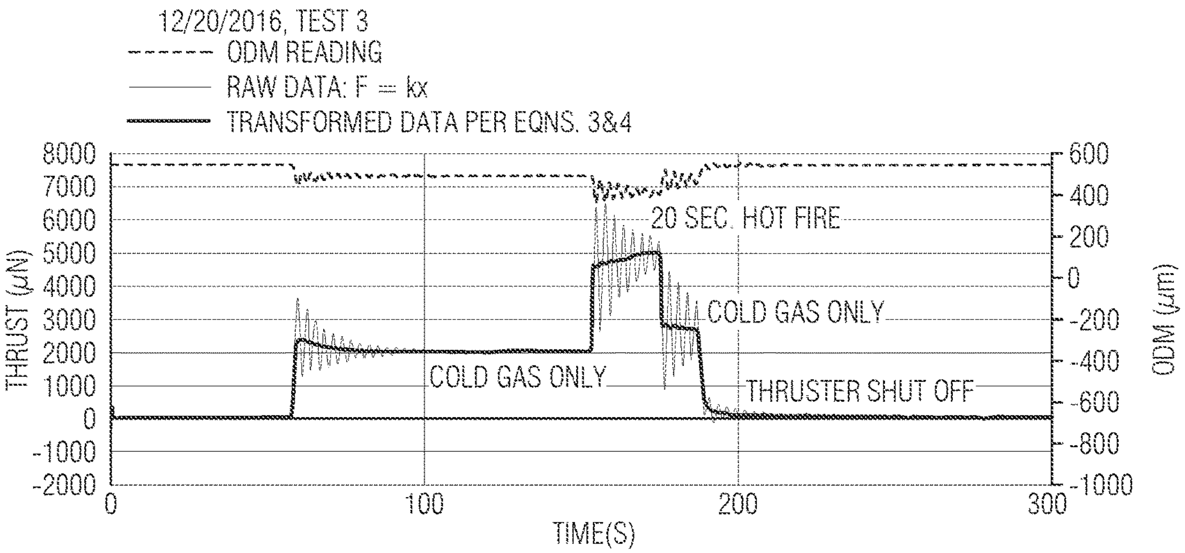
FIG. 4
FIG. 5A
FIG. 5B
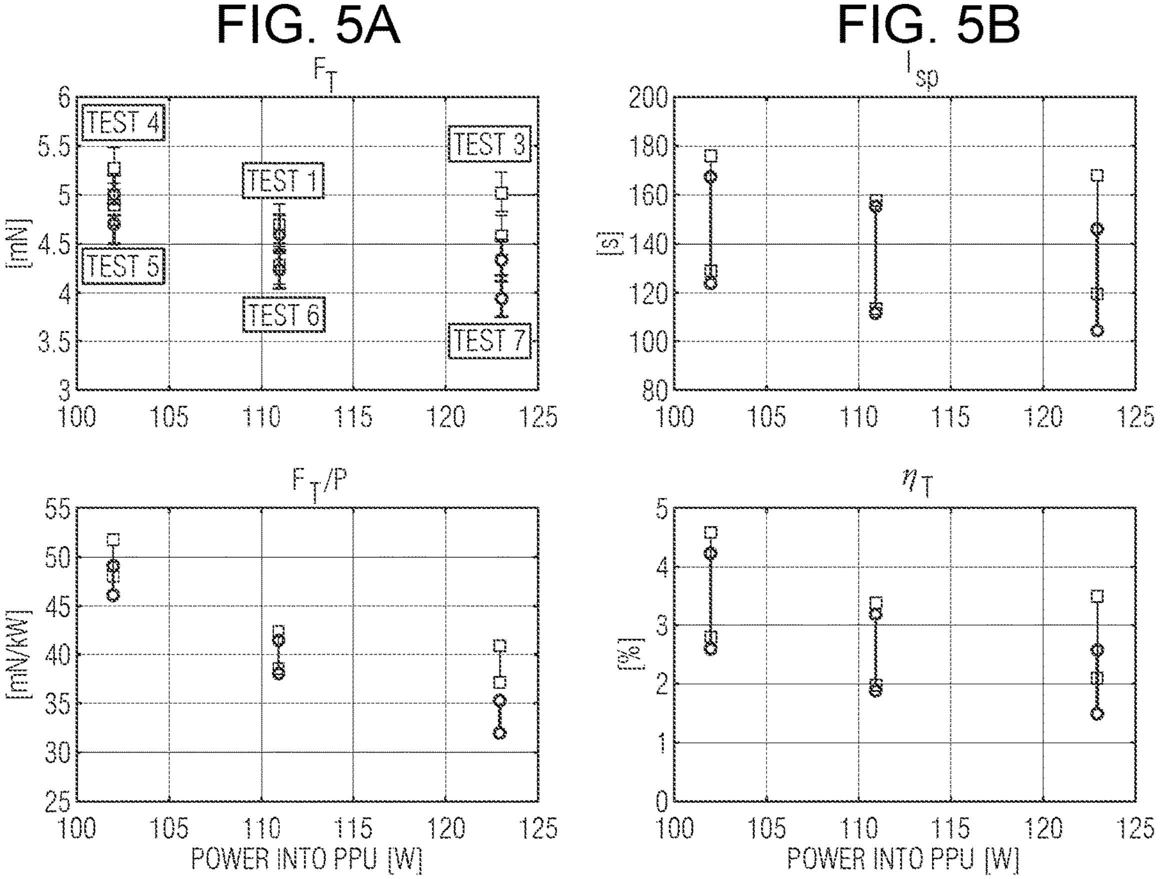
FIG. 5C
FIG. 5D

PLASMA PRODUCTION AND CONTROL DEVICE

CROSS-REFERENCE TO RELATED APPLICATIONS

This application is a continuation of International Patent Application No. PCT/US17/59096, filed Oct. 30, 2017, which claims benefit of U.S. Provisional Application 62/437,607, filed Dec. 21, 2016, both of which are hereby incorporated by reference in their entireties.

STATEMENT OF GOVERNMENT-SPONSORED RESEARCH

This invention was made with government support under NASA/Ames Research Center Contract No. NNA15BA42C. The government has certain rights in the invention.

FIELD OF THE INVENTION

This invention generally relates to plasma production and control devices and associated components that may be used, for example, in the field of satellite propulsion including thrusters. Specifically, the present invention relates to a device that is capable of producing a plasma and controllably accelerating and ejecting the plasma ions from the device.

BACKGROUND OF THE INVENTION

Radio frequency (RF) thrusters are electric propulsion systems that use radio frequency electromagnetic signals to accelerate a plasma propellant, thereby generating thrust. RF thrusters vary widely in power budget and plasma-acceleration mechanism. Electromagnetic RF thrusters, such as the multi-kW scale VAriable Specific Impulse Magnetoplasma Rocket (VASIMR) engine and the lower power Beating Electrostatic Wave (BEW) thruster concept, use electromagnetic forces to accelerate ions. Electrostatic RF thrusters, such as the Helicon Double Layer Thruster (HDLT) and the Neptune thruster, use both free-standing DC and applied RF electric fields to accelerate ions. Electrothermal RF thrusters, such as electron cyclotron resonance thrusters, drive ion acceleration primarily through heating of constituent plasma particles via the applied RF signals. Using RF systems for electric propulsion presents several advantages. First, a considerable knowledge base of RF plasma generation and heating already has been established through on-going efforts in the plasma processing and plasma fusion communities. Second, RF plasma systems can efficiently generate very highly ionized plasmas with relatively moderate to low input RF power, ultimately increasing an RF thruster's efficiency. Third, RF electronic active components have been miniaturized largely through the progress made by the cellular and wireless power industries, increasing their suitability for low mass budget spacecraft applications.

SUMMARY OF THE INVENTION

The present invention provides an electrothermal RF plasma production system and thruster design, and associated components, that may be used in terrestrial applications, in large-scale satellite and launch vehicle upper stage propulsion systems, and/or miniaturized to the mass, volume, and power budget of Cube Satellites (CubeSats) to meet the propulsion needs of the small satellite (~5 to ~500 kg) constellations and larger satellites.

In one aspect, the invention provides a plasma production device comprising:

(a) a plasma production chamber having an upstream first closed end and a downstream second open end;

(b) one or more magnets configured to establish a magnetic field within the plasma production chamber and oriented substantially parallel to a central longitudinal axis of the plasma production chamber such that each magnet produces a magnetic field of the same polarity within the plasma production chamber, wherein the magnetic field has a progressively decreasing strength in the upstream-to-downstream direction (i.e., establishes a substantially unidirectional magnetic field);

(c) a propellant tank and a flow regulator in communication with the plasma production chamber through the first end and configured to deliver a gaseous propellant along the central longitudinal axis of the plasma production chamber; and (d) a radio frequency (RF) antenna external to the plasma production chamber, electrically coupled to an AC power source, and configured to deliver an RF energy to an interior portion of the plasma production chamber.

In some embodiments, the plasma production chamber is cylindrical or frustoconical. In some embodiments, the device has a cylindrical plasma production chamber having a diameter of about 1-5 cm. In some embodiments, plasma production chamber has a length, from the closed end to the open end, of about 5-10 cm.

In some embodiments, the antenna is a coiled antenna, helical antenna, or half-helical antenna. Optionally, the antenna is a coiled antenna and is right-handed. Optionally, the coiled antenna has 1-5 turns.

In some embodiments, the plasma production device comprises at least one (e.g., 1, 2, 3, 4, or more) planar or annular magnets upstream of the closed end. Optionally, the plasma production device does not have a magnet upstream of the closed end. In some embodiments, the plasma production device comprises at least one (e.g., 1, 2, 3, 4, 5, 6, or more) annular magnets which circumnavigate the plasma production chamber. Optionally, some or all of the annular magnets are disposed entirely downstream of the closed end. Optionally, the plasma production device does not have any annular magnets. Optionally, the plasma production device has at least one planar or annular magnet upstream of the closed end and at least one annular magnet that circumnavigates the plasma production chamber. Annular magnets by be unitary or segmented. The various magnets may be permanent magnets, electromagnets, or a mixture of both. Optionally, all magnets are positioned upstream of the antenna (i.e., no magnets are disposed over, under, or around the antenna or downstream of the antenna).

In some embodiments, the RF energy is in the HF band and/or VHF band (i.e., has a frequency of 3-300 MHz).

In some embodiments, the propellant is delivered to the plasma liner (plasma production chamber) at, or the propellant delivery system is configured for a flow rate of 0.001-5.0 mg/s including, for example, about 0.001, 0.01, 0.1, 1.0, 1.5, 2.0, 2.5, 3.0, 3.5, 4.0, 4.5, and 5.0 mg/s, or about 0.01-5.0 mg/s, 0.1-5.0 mg/s, 1.0-5.0 mg/s, 2.0-5.0 mg/s, or 3.0-5.0 mg/s.

By "AC power source" is meant an upstream component that provides alternating current to a downstream component. An AC power source may directly provide alternating current or may be the combination of a direct current (DC)

power source and a DC-to-AC converter such as an inverter, and optionally a power amplifier.

By "flow regulator" is meant any device or mechanism that regulates the flow of propellant into the plasma liner at a desired flow rate. Flow regulator includes, for example, a step-down regulator that reduces the plasma liner inlet pressure to the desired pressure and flow rate from the higher propellant pressure in the propellant tank. Optionally, the flow regulator includes a bang-bang valve, plenum, and/or a proportional flow control valve (PFCV).

By "HF band" or "high frequency band" is meant the range of radio frequency (RF) or electromagnetic radiation waves having a frequency of 3-30 MHz.

By "ion" is meant the positively-charged plasma ions formed from the neutral propellant gas, as distinguished from the negatively-charged electrons.

By "plasma" is meant an ionized state of matter generated from a neutral propellant gas that primarily consists of free negatively-charged electrons and positively-charged ions, wherein, the density of charged particles, $n_e$ is greater than 0.5% of the density of total particles $n_T$ (charged and neutral) in the system, or $n_e/n_T>0.005$.

By "plasma liner" or "plasma production chamber" is meant the physical chamber, having a closed end and an open end, in which the propellant is ionized to form plasma. In some embodiments, the plasma liner is cylindrical, frustoconical, cubic, or cuboidal. In a frustoconical design, it is preferred that the small face (smaller diameter) forms the closed end and the large face (i.e., larger diameter) forms the open end. Propellant may be introduced into the plasma liner through an aperture or nozzle in the closed end. The open end serves as an exit for the plasma which, in conjunction with the associated magnetic field described herein forms a nozzle for directing the plasma out of the plasma liner. The plasma liner may be constructed from, or lined with, any suitable material that is resistant to plasma-induced corrosion and/or is transparent or substantially transparent to the antenna-generated RF. Suitable plasma liner materials include, for example, various ceramics; such as alumina, boron nitride, alumina nitride, and Macor®; glasses such as borosilicate, quartz, and Pyrex®; and refractory metals such as graphite, tungsten, carbon, tantalum, and molybdenum. The plasma liner is generally designed in conformance with magnetic field generated therein in a manner that minimizes the erosion of the inner surface by the generated plasma ions.

By "plume" is meant the area immediately outside of the open end of the plasma liner and is formed by the ejection of plasma ions and electrons from within the plasma liner. The "plume" may refer to the plume of the thruster generally, in thruster applications, or the plume of the plasma liner component of the thruster, specifically, from which the plasma ions are ejected.

By "propellant" is meant a neutral gas that is capable of being ionized into plasma. Typical propellants suitable for use in this invention include the noble gases including, for example, helium, neon, argon, krypton, xenon, and radon; molecules such as water, iodine, nitrogen, and oxygen; and alkali metals such as cesium, sodium, and potassium.

By "VHF band" or "very high frequency band" is meant the range of radio frequency (RF) or electromagnetic radiation waves having a frequency of 30-300 MHz. including, for example the band at about 100-300 MHz, 150-300 MHz, 200-300 MHz, 100-250 MHz, 150-250 MHz, and 100-200 MHz.

DESCRIPTION OF DRAWINGS

FIG. 4 is a graph showing a representative thrust stand response during cold gas and hot fire test of the RFT-0 prototype.

FIGS. 5A-5D are a series of graphs summarizing the data presented in TABLE 2. The vertical lines indicate the range in values calculated driven by the change in measured thrust over the course of a hot fire. Error bars on specific thrust measurements are shown in FIG. 5A as these were the only measurements that were not complicated by the large uncertainty in rh.

DETAILED DESCRIPTION

The present invention provides plasma production and control devices and associated components that may be used, for example, in the field of satellite propulsion including thrusters. The plasma production and control devices may be miniaturized to the mass, volume, and power budget of Cube Satellites (CubeSats) to meet the propulsion needs of the small satellite (~5 to ~500 kg) constellations and all-electric propulsion satellite buses. The plasma production and control system is capable of producing a plasma and controllably accelerating and ejecting the plasma ions from the device. In one advantageous configuration, the system is capable of "rebounding" plasma ions such that any ions produced with movement in a direction opposite to the exit nozzle or orifice will be slowed, the direction reversed, and then accelerated out of the nozzle/orifice by magnetic dipole forces, thereby increasing the thrust (in propulsion applications) and functional plasma production escaping the system.

Integrated Plasma Production Device

Figure 1A:
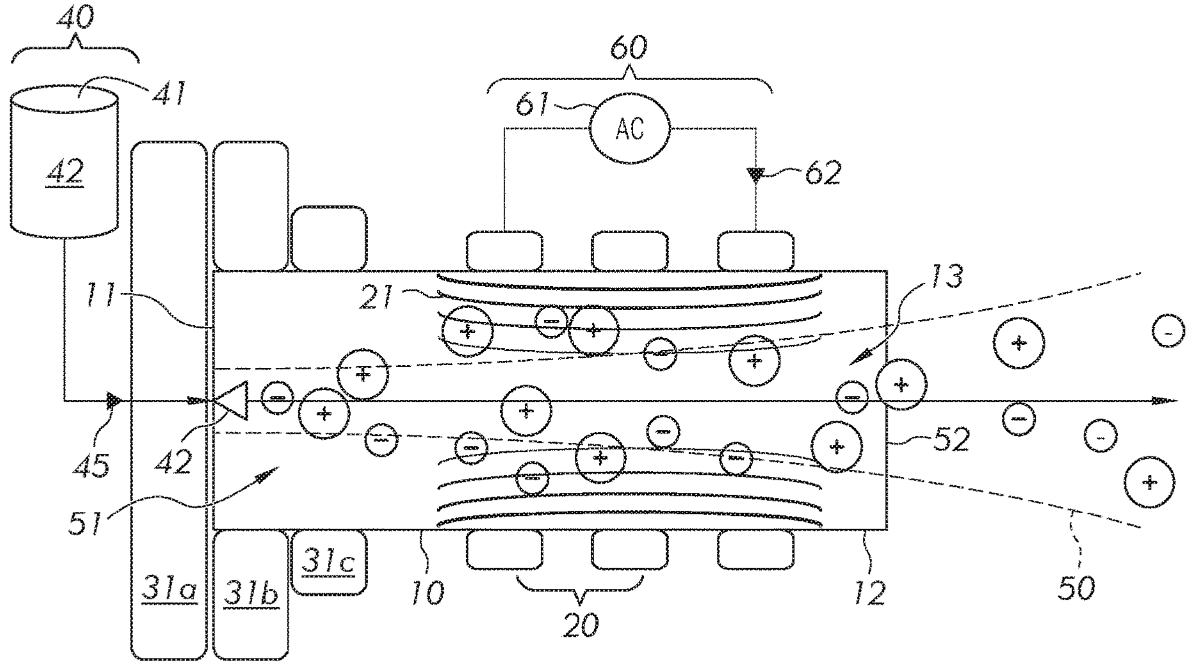
FIG. 1A is a schematic diagram of an integrated thruster design that embodies the principles described herein.

FIG. 1A is a schematic diagram of an integrated plasma production and control device that may be integrated into a satellite thruster-type propulsion device. The plasma production device 100 has a plasma liner 10 (shown here as cylindrical) having a closed end 11 and an open end 12 having opening 13. When referring to directionality, proximal or upstream is in the direction towards closed end 11 and distal or downstream is in the direction toward open end 12 and opening 13.

A propellant delivery system 40 is located external to plasma liner 10, and has at least a propellant tank 41 configured to deliver a flow of gaseous propellant 42 to the interior of plasma liner 10. Propellant tank 41 serves as a reservoir for pressurized propellant 42. Optionally, propellant delivery system 40 also comprises flow regulator 45 configured to meter the flow of propellant 42 into plasma liner 10. In some embodiments, propellant 42 is delivered to the interior of plasma liner 10 at a rate of about 0.01-5.0 mg/s.

Plasma production device 100 also has a magnet system 30 having radially-disposed magnets 31 about plasma liner 10 such that each magnet produces a magnetic field 50 of the same polarity (either positive or negative) within plasma liner 10. Magnet system 30 forms within plasma liner 10 a unidirectional magnetic field 50 with field lines running substantially parallel to the longitudinal axis of liner 10 and characterized as having an upstream section 51 of relatively high magnetic field strength and a downstream section 52 having a progressively decreasing magnetic field strength in the downstream direction. The magnetic field diverges (i.e., expands radially) only in the downstream direction. Downstream section 52 and opening 13 together form a nozzle through which plasma ions pass from the interior of plasma liner 10 to the exterior, thereby generating thrust. Plasma production device 100, including magnet system 30 is configured such that the highest magnetic field strength is proximal/upstream relative to antenna 20, and magnetic field 50 progressively decreases in strength over the functional length of plasma liner 10 in the proximal-to-distal direction. This configuration may be referred to as a "solely diverging" magnetic field configuration because plasma 60 created in the proximity of antenna 20 will move preferentially in the downstream direction (i.e., down the magnetic field gradient). As discussed in more detail below, this "solely diverging" configuration also results in an "ion rebounding" effect in which plasma ions initially moving toward closed end 11 are decelerated and ultimately reversed in direction to be ejected from plasma liner 10 instead of impacting closed end 11 or the upstream region of plasma liner 10. This "ion rebounding" effect significantly increases the functional efficiency of plasma production device 100.

Figure 1B:
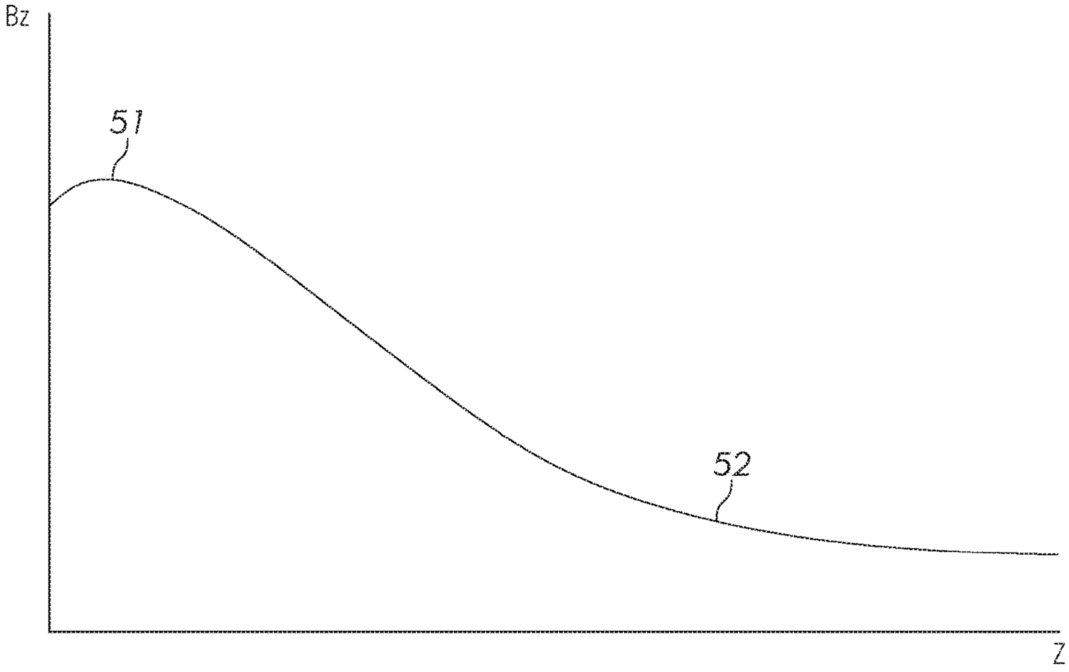
FIG. 1B is a graph showing the magnetic field strength across the longitudinal length of the plasma liner described in FIG. 1A.

FIG. 1B is a graph illustrating the strength of magnetic field 50 as a function of plasma liner 10 length from upstream section 51, having relatively high field strength, and downstream section 52 having progressively lower field strength. It is understood that there is no specific boundary between upstream section 51 and downstream section 52 because the field strength is continuously reduced over the length of plasma liner 10.

The "solely diverging" (i.e., unidirectional) magnetic field configuration may be established by placing more and/or stronger magnets at or towards the closed end. FIG. 1A illustrates a configuration that contains three magnets. Magnet 31*a* is located proximal to closed end 11 and magnets 31*b* and 31*c* are located distal to magnet 31*a* and circumnavigating plasma liner 10. It is understood that this magnet configuration is not limiting on the invention. For example, magnet system 30 may comprise only magnet(s) proximal to closed end, only magnet(s) circumnavigating the upstream region of plasma liner 10, or a combination of both. In some embodiments, all magnets 31 are located proximal (upstream) to antenna 30.

In some embodiments, all magnets 31 are coaxially aligned relative to the plasma liner axis. In some embodiments the radial magnet or magnets are magnetically polarized in the radial direction (positive or negative). In some embodiments the radially disposed magnets are magnetically polarized in the positive or negative axial direction. In some embodiments the radially disposed magnet is polarized at an angle in between purely radial and purely axial. In some embodiments there are multiple radially disposed magnets, with varying magnetic polarization directions. In some embodiments, magnets 31 are permanent magnets, electromagnets, or a combination of both.

Antenna 20 is configured to deliver an RF field 21 to the interior of plasma liner 10. Antenna 20 may be a coiled antenna, a half-helix antenna, helical antenna, or in any other suitable configuration sufficient to cause ionization of propellant 42 into plasma 60 when propellant 42 is exposed to RF field 21 under appropriate power conditions as described herein. In some embodiments, antenna 20 is in direct contact with the external surface of plasma liner 10.

Antenna 20 is powered by power control system 60 which may comprise battery 61 and, optionally, inverter 62. In some embodiments, power control system 60 provides DC current which is converted to AC current by inverter 62 prior to delivery to antenna 20. In some embodiments, power control system 60 provides DC current which is converted to a small AC current by inverter 62, and is then amplified to a large AC current prior to delivery to the antenna 20 by a power amplifier. A frequency modulator or "clock" is used to define the frequency of oscillation of the AC current.

Figure 2:
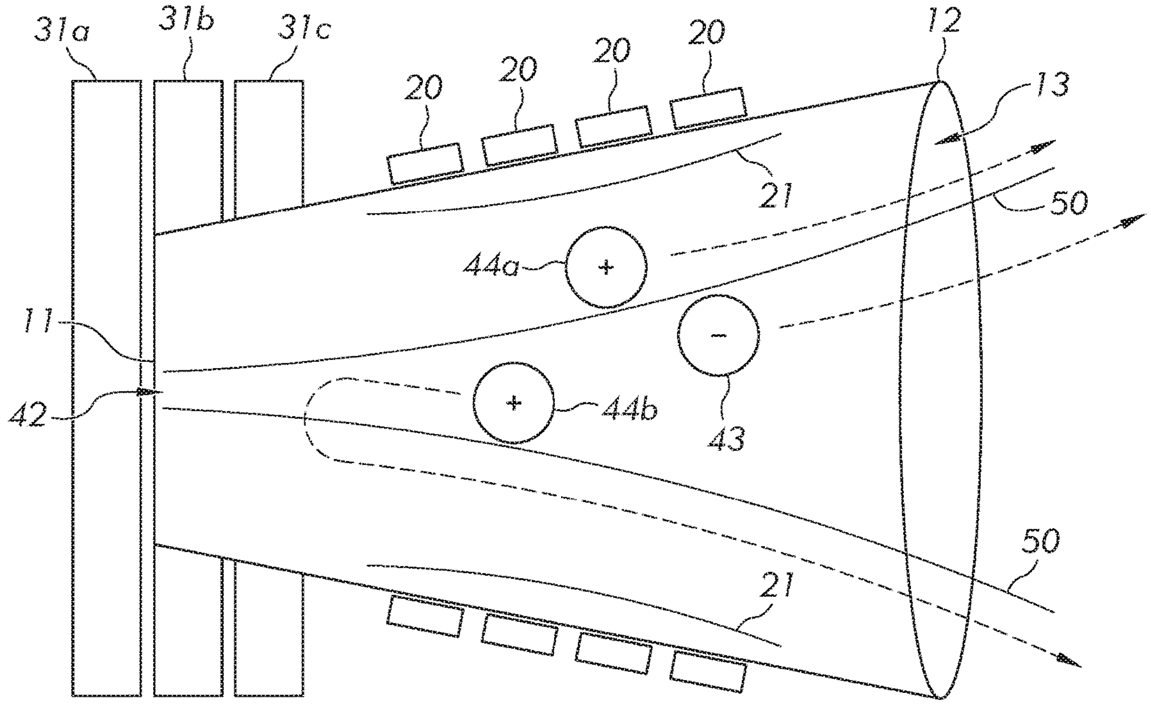
FIG. 2 is a schematic diagram of an integrated thruster design illustrating the ion rebounding effect in a solely diverging magnetic field.

FIG. 2 illustrates the operation of plasma production device 100 having a frustoconical plasma liner 10. The principles are the same regardless of the shape and/or geometry of liner 10. Neutral propellant 42 is delivered to the interior of plasma liner 10 where it is ionized by RF fields 21 generated by antenna 20. Neutral propellant 42 is ionized into electrons 43 and positively-charged propellant ions 44. Electrons 43 and ions 44 are further heated by RF fields 21.

By way of example, propellant ion 44*a* is formed and has an initial velocity in the downstream direction. Thus, propellant ion 44*a* is accelerated in the downstream direction (decreasing magnetic field strength) and exits plasma liner 10 through opening 13. Propellant ion 44*b* is formed and has an initial velocity in the upstream direction. However, the strength of magnetic field 50, being highest towards the closed end and increasing in the upstream direction from the site of ionization in the vicinity of antenna 20, causes propellant ion 44*b* to decelerate in the upstream direction, eventually reverse direction, and then accelerate in the downstream direction until ejected from plasma liner 10. This is referred to as the "ion rebounding" effect.

The ion rebounding effect produced by the solely diverging magnetic field configuration provides several advantages. First, propellant ion 44*b* would impact closed end 11 or the upstream region of plasma liner 10 in existing plasma production configurations which do not have a "solely diverging" magnetic field. The ion rebounding effect therefore increases the apparent efficiency of the plasma production system because of the reduction in ion loss through impact with plasma liner 10. Electron 43 may experience a similar rebounding effect which causes to increase the propellant ionization efficiency as the rebounded electrons are returned to the bulk of the neutral propellant and are available to ionize neutral propellant atoms rather than being lost to impact on the inner surface of liner 10. This increase in efficiency is advantageous both in propulsion applications and in industrial processes (i.e., not involving propulsion) which are required to controllably direct a plasma.

Second, the plasma production device 100 generally, and the magnetic field 50, specifically, experience increased total motive impulse by ion rebounding. Specifically, the deceleration, rebound, and subsequent acceleration of a propellant ion creates at least twice the motive impulse compared to an initially stationary ion that is accelerated in the downstream direction and out of the plasma liner. The solely diverging magnetic field configuration, by virtue of the ion rebounding effect, therefore generates significantly more thrust in propulsion applications than an equivalently-configured device having a different magnetic field configuration.

The various components of plasma production device 100 and associated design considerations are discussed in more detail below.

Plasma Production Apparatus—General Considerations

As described above, propellant gas is injected into plasma liner 10 along the longitudinal axis of the plasma liner from the closed end 11 in the direction of the open end 12. The plasma liner 10 is wrapped in an inductive RF coil (antenna 20) through which an alternating current is driven at a specified RF frequency. In some embodiments, the RF frequency is in the high frequency (HF) to very high frequency (VHF) bands (from 3 to 30 MHz and 30 to 300 MHz, respectively). The alternating current may be supplied from an alternating current power source (e.g., grid power) for example in certain terrestrial application, or from solar panels and/or DC batteries for other terrestrial and space (on-orbit) applications. It is well-known that DC current may be converted to AC through various means including, for example, an inverter, and if necessary, a power amplifier.

Plasma liner 10 and antenna 20 are positioned inside the generated magnetic field. The magnetic fields have a specified strength as a function of position within the plasma liner 10, which rapidly expands radially in the reference frame of an accelerated plasma particle traveling out of the liner 10 thereby forming a "magnetic nozzle". When neutral propellant gas is injected into liner 10, the induced oscillating magnetic fields generated by the currents in the antenna 20 both ionize the propellant gas, and then heat the subsequent plasma. Neither multiple RF stages, nor extra electron-generating mechanisms are used for ionization or plasma heating. The heating directly impacts the electrons. Electrons are accelerated to very high energies (~50 eV) through inductive and stochastic interactions with the near RF fields 21 from the antenna 20. The electrons, undergoing significant elastic collisions inside liner 10, expand rapidly along the magnetic field lines that run substantially parallel with the longitudinal walls of liner 10.

The magnetic field geometry within liner 10 ensures that electrons maintain enough time in regions of high neutral (i.e., non-ionized propellant) density to produce significant ionization of the propellant gas via electron collisions with the neutral particles, and that electrons that are lost are largely lost via expansion in the magnetic nozzle, rather than upstream towards the closed end 11 of liner 10. The rapid flux of electrons into the plume of the thruster creates a momentary charge imbalance in the thruster. The slower positively-charged propellent (e.g., xenon) ions are then pushed out of the plasma liner 10 via the charge imbalance at a rate sufficient to satisfy overall ambipolar fluxes of particles out of the system. The ion acceleration generated therein is the primary source of thrust when plasma liner 10 and its associated components are integrated into a thruster.

Optionally, plasma production device 100 also has a plasma heating source. In some embodiments, the plasma heating source is adapted to energize the plasma ions and/or electrons to impart an additional velocity in either or both of the upstream and downstream directions. The plasma heating source is preferably configured to energize the plasma ions and/or electrons in the upstream direction to maximize the ion rebounding effect. The plasma heating source generally produces of radio frequency waves between 5 and 30 MHz in frequency. The heating source can range in applied power from 10 W to 300 W. In some embodiments, the heating source can be the same as the ionization energy source (i.e., antenna).

Antenna and Antenna Geometry

Antenna 20 is configured to deliver an RF field 21 to the interior of plasma liner 10. Antenna 20 may be a coiled antenna, a half-helix (e.g., as shown in FIG. 9 of Chen, *Plasma Sources Sci. Technol.*, 24:014001, 2015), helical, or in any other suitable configuration sufficient to cause ionization of propellant 42 into plasma 13 when propellant 42 is exposed to RF field 21 under appropriate power conditions as described herein.

Antenna 20 may be fashioned from silver or related alloys, gold or related alloys, aluminum, stainless steel, steel, copper, bronze, graphite, tungsten, or possibly any rigid and electrically conducting material, or any other suitable material for this purpose. In some embodiments, antenna 20 is fashioned from a flattened rectangular or square wire, a transmission line, a vapor-deposited material on an insulating substrate, or any other rigid and electrically conducting material processing technique.

In some embodiments, antenna 20 comprises 1-20 turns (e.g., 1-15, 1-11, 1-9, 1-7, 1-5, 1-3, 1-2, 2-15, 2-11, 2-9, 2-7, 2-5, 2-3, 3-15, 3-11, 3-9, 3-7, 3-5, 4-15, 4-11, 4-9, or 4-7 turns) in a clockwise or counter clockwise fashion, with electric and mechanical interfaces to feed the antenna with current and to mechanically mater the antenna to the thruster around the external surface of plasma liner 10. The loops may be electrically connected by at least two straps that travel in a helical fashion from the back loop to the front loop. If the straps rotate in a clockwise fashion from one loop to the next, the antenna is "right handed." Conversely if the straps travel in a counter clockwise fashion, the antenna is "left handed." Two "legs" may be attached, one to either loop on the helix, which are designed to interface in an AC electrical circuit. The AC electrical current is applied to these legs to run currents through the geometry of the antenna, inducing electromagnetic fields in the antenna core, such that when a plasma is generated underneath the antenna it is heated by these fields.

Working Prototype

A working prototype of the plasma production and control system, including a solely-diverging magnetic field, was built and tested as described below in a thruster configuration/application. This prototype is designated RFT-0.

The purpose of direct thrust testing the RFT-0 early on was twofold: to validate the concept of a miniaturized RF thruster in the HF band, and to establish an early set of fiducial data points from which progress could be directly compared. As a result, limited time was devoted to thruster optimization, and the measured performance was expected to be suboptimal. Nevertheless, the test results proved that the volumetric power density of the RFT-0 placed the unoptimized system in close contention with existing, larger helicon thrusters with significantly larger power budgets.

Figure 3:
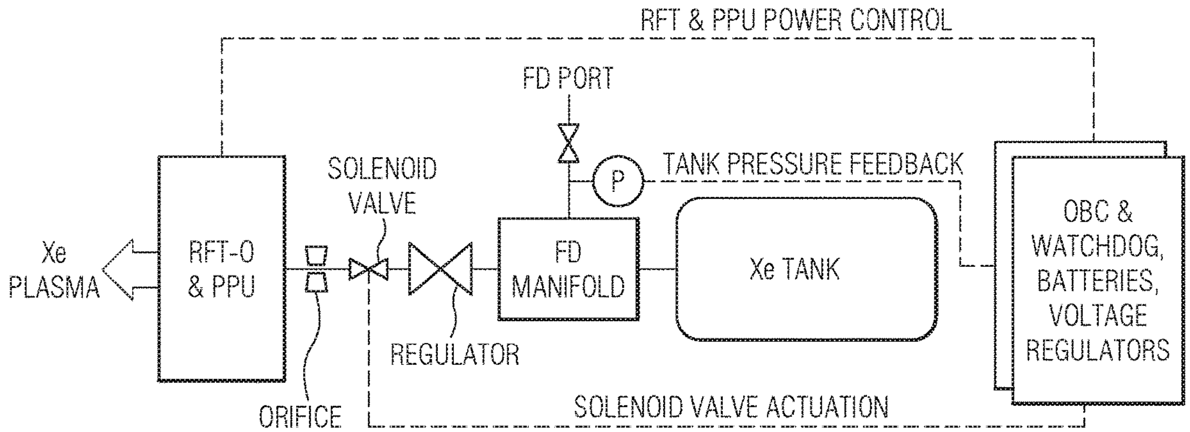
FIG. 3 is a schematic diagram of the experimental RFT-0 test bus.

The RFT-0 test bus is illustrated in the schematic provided in FIG. 3. Measurement of the expected mN's of thrust from the RFT-0 system required developing a test unit that minimized power and gas feed throughs from the vacuum chamber wall to the thrust stand, as these would introduce significant uncertainty on the measurements. To achieve this, a laboratory propellant management unit (PMU) and on-board computer (OBC) using primarily commercial off the shelf (COTS) components was developed. A xenon tank, made from a modified hand-held SCUBA tank was pressurized to 500 PSI via a custom machined fill-drain (FD) manifold. The pressure in the tank was monitored through a high-pressure transducer installed in the FD manifold. The high pressure was regulated down to 30 PSI using a small form-factor COTS regulator. The 30 PSI xenon gas was flowed via a medical solenoid valve into a flex hose plenum, capped with a 10 μm orifice. The flex hose and orifice were mated to the gas feed interface in the plasma liner of the RFT-0. The RFT-0 power processing unit (PPU) both regulated the applied DC power, and inverted it into an RF signal applied to the antenna. The PPU power, the solenoid valve actuation duty cycle and frequency, and the tank pressure feedback were all monitored and controlled using an on-board computer (OBC) that consisted of a Raspberry-Pi-based controller and a Texas Instruments MSP430 development board-based watchdog. The entire system was controlled wirelessly over the laboratory WiFi network. The implementation of these components allowed the RFT-0 to be tested with only a single power feed through from the vacuum chamber to the thrust stand, which consisted of a primary voltage rail that was subsequently regulated and distributed to the systems on board the test bus via the OBC and on-board regulation circuitry.

The solenoid valve was driven at 30 Hz and 35% duty cycle for all measurements. To calibrate the mass flow rate ($\dot{m}$) into the liner, the test bus was operated in a small vacuum chamber at high vacuum. Pressure was actively measured on the high vacuum side of the chamber with a hot filament ion gauge. The small vacuum chamber had a dedicated xenon supply to the inside of the chamber via an Alicat mass flow controller with an accuracy of ±0.01 mg/s. The test bus was commanded to actuate the solenoid valve at the 30 Hz 35% duty cycle standard rate, and the pressure rise in the chamber was monitored until it reached a steady state. The solenoid valve was then commanded to 0% duty cycle, shutting off the mass flow rate of xenon from the test bust into the chamber. The Alicat mass flow controller was then commanded to operate at a fixed standard mass flow setting until the equilibrium pressure of the chamber settled at the same pressure as when the test bus was flowing xenon. The Alicat mass flow setting was then associated with the 30 Hz 35% duty cycle actuation rate of the solenoid valve.

Unfortunately, throughout testing inconsistencies in the measured cold gas thrust and the mass flow rate on the controller associated with a fixed solenoid valve actuation rate of up to ~10% were present. It was later determined that these were likely due to the heating of the gas plenum upstream of the orifice through heating of the solenoid valve, as well as insufficient valve driver circuitry. The associated mass flow rate with the fixed valve actuation rate was determined to be 3.5±0.5 mg/s ($\dot{m}\pm\delta\dot{m}$). Consequently, for each thrust analysis presented in the following sections, the range 3.0 to 4.0 mg/s is used to determine a bound on the specific impulse ($I_{sp}$) and thrust efficiency ($\eta_T$). This represents the largest source of uncertainty in specific impulse and thrust efficiency calculations.

Example 1—Thrust Measurements

Experimental Design

The following measurements were performed under contract by The Aerospace Corporation. The vacuum chamber for thrust measurements was approximately 3.7 m long and 2.4 m in diameter. It had a baseline pressure of approximately $10^{-7}$ Torr and was pumped by a 12,690 l/s Roots blower backed by eight parallel 141 l/s Stokes 412 roughing pumps, and 2× Edwards STP-iXA3306 Series turbopumps. The base pressure observed during testing the RFT-0 and test bus was $7{:}2\times10^{-6}$ Torr.

The thrust stand used was based on a torsional design and consisted of a rigid aluminum arm, balanced atop a frictionless pivot with a calibrated spring constant. Similar designs have been documented in literature. The thrust stand used for this work was a scaled-up version of a 100 μN thrust stand with 1 μN sensitivity. The thruster was mounted on one side of the arm, and counterweights were used to balance the arm on the opposite side. When the thruster fired, the arm was displaced, and the displacement was measured via an optical displacement meter; the thrust was calculated directly from the resulting displacement and the known spring constant.

The main arm of the thrust stand is made of rectangular aluminum tubing to save weight while maximizing rigidity. The pivot spring constant was nominally 0.181 N-m/rad (0.0279 in-lb/deg, Riverhawk Industries) and was held in place by custom stainless steel mounts. The thrust stand was calibrated using known electrostatic forces between a pair of bare aluminum electrodes, shown on the left side of the thrust stand. The electrodes were held far from the thrust stand body to minimize fringing effects. A delrin flag attached to the back of the larger electrode which held a small (7 mm diameter) mirror was the target for the optical displacement meter (Philtec). The moment arms for the electrodes and the optical displacement meter were equivalent (0.5 m), and the moment arm to the thruster was 0.3 m.

Experimental Data

FIG. 4 shows a representative response and analysis of the thrust stand during a cold gas and hot fire event. Calibration of the thrust stand using the electrodes was performed several times a day, approximately once every 1-2 hours, and at least at the beginning and end of each test day. The electrode spacing (1 mm) was set each day. The calibration spring constants varied between 36.5721 to 38.707 μN/μm. These units directly convert displacement at the optical displacement sensor (μm) to force (μN) at the thruster moment arm. The transform was applied to each data set. The oscillating lines are the raw data (F=kx, where x is the displacement at the displacement sensor), and the black smoothed line is the transformed data. The transform variables are combined values from the first and last calibrations taken that same day. As seen in FIG. 4, during a hot fire event, the measured thrust value increased in time. This may have been caused by a number for factors including heating of gas in the plenum, and an unstable design feature in the prototype power processing unit. As a result, for each test run, minimum and maximum measured thrust values are provided.

TABLE 1

RFT-0 Prototype Testing Data With Calculated Values of $F_T$ and Uncertainties.

| Name | $P_{ch}$ [$10^{-4}$ Torr] | $F_{cg}$ [mN] | P [W] | Min/Max $F_T$ [mN] | $\delta F_T$ [mN] | Δt [s] |
|---|---|---|---|---|---|---|
| 122016-2 | 1.51 | 2.000 | 111 | 4.280/4.700 | 0.192 | 30 |
| 122016-3 | 1.58 | 2.050 | 123 | 4.580/5.030 | 0.205 | 20 |
| 122016-4 | 1.64 | 2.200 | 102 | 4.900/5.270 | 0.213 | 22 |
| 122016-5 | 1.54 | 2.100 | 102 | 4.700/5.000 | 0.203 | 30 |
| 122016-6 | 1.54 | 2.050 | 111 | 4.230/4.600 | 0.186 | 20 |
| 122016-7 | 1.48 | 1.950 | 123 | 3.940/4.350 | 0.177 | 23 |
| 122116-1 | 0.67 | 0.950 | 102 | 2.000/2.135 | 0.056 | 22 |
| 122116-2 | 0.81 | 1.100 | 102 | 2.400/2.600 | 0.063 | 30 |
| 122116-3 | 0.87 | 1.250 | 111 | 2.200/2.600 | 0.056 | 25 |
| 122116-11 | 1.41 | 1.720 | 102 | 3.700/4.580 | 0.096 | 80 |
| 122116-12 | 1.01 | 1.400 | 102 | 3.100/4.000 | 0.084 | 100 |

TABLE 1 provides the measured data from RFT-0 testing at The Aerospace Corporation. $P_{ch}$ is the pressure in the vacuum chamber as measured by a hot filament ion gauge while running the thruster in pure cold gas mode. The data were calibrated to account for a xenon background gas. $F_{cg}$ shows the cold gas thrust as measured by the thrust stand prior to a hot fire event (~50 to 150 s in FIG. 4). $F_T$ shows the minimum and maximum hot fire thrust measured during a hot fire event, with the following column displaying the measurement uncertainty as a result of errors propagated down from calibration and analysis of the data, as described in the previous section. Finally, Δt shows the duration the hot fire thrust event was held for.

Analysis

TABLE 2

Analyzed data from the first test day using estimated ṁ and carrying uncertainties through calculations of $I_{sp}$ and $\eta_T$.

| Name | P [W] | Min/Max $F_T$ [mN] | ≈Min/Max $I_{sp}$ [s] | ≈Min/Max $\eta_T$ |
|---|---|---|---|---|
| 122016-2 | 111 | 4.280/4.700 ± 0.192 | 110/156 | 0.020/0.034 |
| 122016-3 | 123 | 4.580/5.030 ± 0.205 | 117/167 | 0.021/0.035 |
| 122016-4 | 102 | 4.900/5.270 ± 0.213 | 126/175 | 0.028/0.046 |
| 122016-5 | 102 | 4.700/5.000 ± 0.203 | 121/166 | 0.026/0.042 |
| 122016-6 | 111 | 4.230/4.600 ± 0.186 | 109/153 | 0.019/0.032 |
| 122016-7 | 123 | 3.940/4.350 ± 0.177 | 101/144 | 0.015/0.026 |

TABLE 2 shows the estimated $I_{sp}$ and $\eta_T$ for the data obtained during the first test day for which the mass flow rate was best known and characterized. FIG. 5 summarizes the data from Table 2 in graphical form. FIG. 5A $F_T$ data from Tests 1-6. The vertical lines describe how the thrust changed over the course of a hot fire. Error bars are included in this panel to show the uncertainty in the measurement due to known uncertainties in the thrust stand and the analysis fitting parameters. FIGS. 5B-5D show $I_{sp}$, $F_T$/P, and $\eta_T$, respectively. Likewise, the vertical lines in these panels show the range of possible values due to both the range in FT observed during a hot fire, and the large uncertainty in ṁ.

DISCUSSION

Despite the RFT-0 and test bus's lack of optimization and sophistication, despite the large uncertainties and unknowns for these tests, and despite the variation in performance during the course of a hot fire, the data exhibit one salient piece of information: the RFT-0 already meets or exceeds the performance and efficiency of other RF thrusters, which have been tested on a direct thrust stand, that operate at much higher powers and are significantly more massive. Specifically, inductive and helicon thrusters tested at the Australian National University, the University of Michigan, and Georgia Institute of Technology heated plasmas with RF powers varying between 100 W and 2 kW, and yielded thrust values between 0.5 and 12 mN, specific impulses between 50 and 350 seconds and thrust efficiencies between 0% and 2%. The RFT-0 immediately produced similar thrust figures, $I_{sp}$ of 100 to 200 seconds, and $\eta_T$ between 1% and 5%. Notably, the RFT-0 yielded a thrust per power between 30 and 55 mN/kW, and had a total mass when installed in the test bus of under 3 kg.

It will be appreciated by persons having ordinary skill in the art that many variations, additions, modifications, and other applications may be made to what has been particularly shown and described herein by way of embodiments, without departing from the spirit or scope of the invention. Therefore, it is intended that scope of the invention, as defined by the claims below, includes all foreseeable variations, additions, modifications or applications.

What is claimed is:

1. A plasma thruster comprising:

(a) a plasma production chamber having an upstream first closed end and a downstream second open end;

(b) one or more magnets configured to establish a solely diverging magnetic field within the plasma production chamber and oriented substantially parallel to a central longitudinal axis of the plasma production chamber such that each magnet produces a magnetic field of the same polarity within the plasma production chamber, wherein the solely diverging magnetic field has a progressively decreasing strength in the upstream-to-downstream direction;

(c) a propellant tank and a flow regulator in communication with the plasma production chamber through the first closed end and configured to deliver a gaseous propellant along the central longitudinal axis of the plasma production chamber; and (d) a radio frequency (RF) antenna external to the plasma production chamber, electrically coupled to an AC power source, and configured to deliver an RF energy to an interior portion of the plasma production chamber, wherein the progressively decreasing strength of the solely diverging magnetic field is configured to produce an ion rebounding effect for an increase in efficiency of the plasma thruster.

2. The plasma thruster of claim 1, wherein the plasma thruster comprises at least one planar magnet upstream of the first closed end.

3. The plasma thruster of claim 1, wherein the plasma thruster comprises at least one annular magnet.

4. The plasma thruster of claim 3, wherein the plasma thruster comprises 1-6 annular magnets.

5. The plasma thruster of claim 4, wherein the annular magnets are segmented.

6. The plasma thruster of claim 1, wherein all magnets are disposed upstream of the antenna.

7. The plasma thruster of claim 1, wherein the antenna is a coiled antenna.

8. The plasma thruster of claim 7, wherein the coiled antenna is right-handed.

9. The plasma thruster of claim 7, wherein the coiled antenna comprises 1-5 turns.

10. The plasma thruster of claim 1, wherein the plasma production chamber is cylindrical.

11. The plasma thruster of claim 1, wherein an entirety of a longitudinal extension along the central longitudinal axis of the plasma production chamber between the first closed end and the second open end is frustoconical.

12. The plasma thruster of claim 1, wherein the RF energy has a frequency of 3-300 MHz.

13. The plasma thruster of claim 1, wherein the plasma thruster further comprises a plasma heating source.

14. The plasma thruster of claim 10, wherein the plasma production chamber has a diameter of about 1-5 centimeters.

15. The plasma thruster of claim 10, wherein the plasma production chamber has a length of about 5-10 centimeters.

16. The plasma thruster of claim 14, wherein the plasma production chamber has a length of about 5-10 centimeters.

17. A plasma thruster comprising:

(a) a cylindrical plasma production chamber having an upstream first closed end, a downstream second open end, a diameter of about 1-5 centimeters, and a length of about 5-10 centimeters;

(b) one or more magnets configured to establish a solely diverging magnetic field within the plasma production chamber and oriented substantially parallel to a central longitudinal axis of the plasma production chamber such that each magnet produces a magnetic field of the same polarity within the plasma production chamber, wherein the solely diverging magnetic field has a progressively decreasing strength in the upstream-to-downstream direction;

(c) a propellant tank and a flow regulator in communication with the plasma production chamber through the first closed end and configured to deliver a gaseous propellant along the central longitudinal axis of the plasma production chamber; and (d) a radio frequency (RF) antenna external to the plasma production chamber, electrically coupled to an AC power source, and configured to deliver an RF energy at a frequency of 3-300 MHz to an interior portion of the plasma production chamber, wherein the progressively decreasing strength of the solely diverging magnetic field is configured to produce an ion rebounding effect for an increase in efficiency of the plasma thruster.

18. The plasma thruster of claim 17, wherein the plasma thruster comprises 1-6 annular magnets.

19. The plasma of claim 17, wherein all magnets are disposed upstream of the antenna.

20. The plasma thruster of claim 17, wherein the antenna is a coiled antenna.

21. The plasma thruster of claim 17, wherein the plasma thruster further comprises a plasma heating source.

* * * * *